(12) United States Patent
Gower et al.

(10) Patent No.: US 7,299,313 B2
(45) Date of Patent: Nov. 20, 2007

(54) SYSTEM, METHOD AND STORAGE MEDIUM FOR A MEMORY SUBSYSTEM COMMAND INTERFACE

(75) Inventors: Kevin C. Gower, LaGrangeville, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 10/977,793

(22) Filed: Oct. 29, 2004

(65) Prior Publication Data
US 2006/0095646 A1 May 4, 2006

(51) Int. Cl.
*G06F 12/00* (2006.01)
(52) U.S. Cl. .................. 711/100; 711/167; 710/24; 710/30; 710/105
(58) Field of Classification Search ............ 711/5, 711/167; 710/3, 8, 24, 30, 100, 104, 105, 710/305
See application file for complete search history.

(56) References Cited

U.S. PATENT DOCUMENTS

| 3,825,904 | A | 7/1974 | Burk et al. |
| 4,028,675 | A | 6/1977 | Frankenberg |
| 4,135,240 | A | 1/1979 | Ritchie |
| 4,475,194 | A | 10/1984 | LaVallee et al. ............... 371/10 |
| 4,486,739 | A | 12/1984 | Franaszek et al. ... 340/347 DD |
| 4,654,857 | A | 3/1987 | Samson et al. |
| 4,723,120 | A | 2/1988 | Petty, Jr. ................ 340/825.02 |
| 4,740,916 | A | 4/1988 | Martin ........................ 364/900 |
| 4,796,231 | A | 1/1989 | Pinkham ................. 385/189.05 |
| 4,803,485 | A | 2/1989 | Rypinski ..................... 370/452 |
| 4,833,605 | A | 5/1989 | Terada et al. ............... 364/200 |
| 4,839,534 | A | 6/1989 | Clasen ........................ 307/269 |
| 4,943,984 | A | 7/1990 | Pechanek et al. ........... 375/109 |
| 4,985,828 | A | 1/1991 | Shimizu et al. |
| 5,053,947 | A | 10/1991 | Heibel et al. ................ 364/200 |
| 5,177,375 | A | 1/1993 | Ogawa et al. |
| 5,206,946 | A | 4/1993 | Brunk ............................ 710/2 |
| 5,214,747 | A | 5/1993 | Cok ............................ 395/27 |

(Continued)

FOREIGN PATENT DOCUMENTS

| GB | 2396711 A | 6/2004 |
| JP | 04326140 A | 11/1992 |

OTHER PUBLICATIONS

Sivencrona et al.; "RedCAN™ : Simulations of two Fault Recovery Algorithms for CAN;" Proceedings for the 10th IEEE Pacific Rim International Symposium on Dependable Computing (PRDC'04); 2005.

(Continued)

*Primary Examiner*—Jack Lane
(74) *Attorney, Agent, or Firm*—Cantor Colburn LLP; Lynn Augspurger

(57) ABSTRACT

A system for implementing a memory subsystem command interface, the system including a cascaded interconnect system including one or more memory modules, a memory controller and a memory bus. The memory controller generates a data frame that includes a plurality of commands. The memory controller and the memory module are interconnected by a packetized multi-transfer interface via the memory bus and the frame is transmitted to the memory modules via the memory bus.

34 Claims, 17 Drawing Sheets

| COMMAND CATEGORY | COMMAND | PRIMARY COMMAND DECODES | TYPE |
|---|---|---|---|
| XFER 0 BITS (0:2) | | | |
| ACTIVE COMMANDS 1402 | XFER 3 BITS(3:4) | | |
| '111' | '00' | BANK ACTIVATE | 0:3 / 4:7 |
| '111' | '01' | BANK ACTIVATE W/PACKET READ | 0:6 |
| '111' | '10' | BANK ACTIVATE W/PACKET WRITE | 0:6 |
| PAGE AND MRS COMMANDS 1404 | | | |
| '110' | | MODE REGISTER SET | 0:3 / 4:7 |
| '101' | | PAGE WRITE | 0:3 / 4:7 |
| '100' | | PAGE READ | 0:3 / 4:7 |
| OTHER COMMANDS 1406 | XFER 1 BITS(3:5) | | |
| '011' | '000' | OTHER- PRECHARGE | 0:2 / 4:6 |
| '011' | '001' | OTHER- REFRESH | 0:2 / 4:6 |
| '011' | '010' | OTHER- ENTER POWER DOWN MODE | 0:2 / 4:6 |
| '011' | '011' | OTHER- EXIT POWER DOWN MODE | 0:2 / 4:6 |
| '011' | '100' | OTHER- ENTER SELF TIMED REFRESH | 0:2 / 4:6 |
| '011' | '101' | OTHER- EXIT SELF TIMED REFRESH | 0:2 / 4:6 |
| '011' | '110' | OTHER- DRAM CLOCK SYNC | 0:6 |
| '011' | '111' | OTHER- READ DATA RESPONSE | 0:2 / 4:6 |
| '010' | | RESERVED | NA |
| SLOW COMMANDS 1408 | BITS(3:4) | | |
| '001' | '00' | READ CONFIGURATION DATA BUFFER | SLOW |
| '001' | '01' | WRITE CONFIGURATION DATA BUFFER | SLOW |
| '001' | '10' | READ CONFIGURATION REGISTER TO BUFFER | SLOW |
| '001' | '11' | WRITE CONFIGURATION REGISTER TO BUFFER | SLOW |
| NO OPERATION 1410 | | | |
| '000' | | IDLE | 0:2/4:6/0:7 |

U.S. PATENT DOCUMENTS

| | | | |
|---|---|---|---|
| 5,265,049 A | 11/1993 | Takasugi | |
| 5,287,531 A | 2/1994 | Rogers, Jr. et al. | 395/800 |
| 5,347,270 A | 9/1994 | Matsuda et al. | 340/2.21 |
| 5,387,911 A | 2/1995 | Gleichert et al. | 341/95 |
| 5,394,535 A | 2/1995 | Ohuchi | |
| 5,454,091 A | 9/1995 | Sites et al. | |
| 5,475,690 A | 12/1995 | Burns et al. | 370/105.3 |
| 5,513,135 A | 4/1996 | Dell et al. | 365/52 |
| 5,531,135 A | 7/1996 | Dell et al. | 365/52 |
| 5,544,309 A | 8/1996 | Chang et al. | |
| 5,592,632 A | 1/1997 | Leung et al. | 395/306 |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | |
| 5,629,685 A | 5/1997 | Allen et al. | 340/525.02 |
| 5,661,677 A | 8/1997 | Rondeau, II et al. | |
| 5,666,480 A | 9/1997 | Leung et al. | 395/180 |
| 5,764,155 A | 6/1998 | Kertesz et al. | 340/825.08 |
| 5,822,749 A | 10/1998 | Agarwal | |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,973,591 A | 10/1999 | Becjtolsheim et al. | 365/52 |
| 5,974,493 A | 10/1999 | Okumura et al. | |
| 5,995,405 A | 11/1999 | Trick | 365/63 |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | |
| 6,078,515 A | 6/2000 | Nielsen et al. | 365/63 |
| 6,096,091 A | 8/2000 | Hartmann | 716/17 |
| 6,128,746 A | 10/2000 | Clark et al. | 713/324 |
| 6,170,047 B1 | 1/2001 | Dye | |
| 6,170,059 B1 | 1/2001 | Pruett et al. | |
| 6,173,382 B1 | 1/2001 | Dell et al. | 711/170 |
| 6,215,686 B1 | 4/2001 | Deneroff et al. | 365/52 |
| 6,219,288 B1 | 4/2001 | Braceras et al. | |
| 6,260,127 B1 | 7/2001 | Olarig et al. | 711/167 |
| 6,262,493 B1 | 7/2001 | Garnett | |
| 6,292,903 B1 | 9/2001 | Coteus et al. | 713/401 |
| 6,301,636 B1 | 10/2001 | Schultz et al. | 711/108 |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,370,631 B1 | 4/2002 | Dye | |
| 6,378,018 B1 | 4/2002 | Tsern et al. | 710/129 |
| 6,381,685 B2 | 4/2002 | Dell et al. | |
| 6,393,528 B1 | 5/2002 | Arimilli et al. | |
| 6,473,836 B1 | 10/2002 | Ikeda | |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,627 B1 | 11/2002 | Willke et al. | |
| 6,493,250 B2 | 12/2002 | Halbert et al. | 365/63 |
| 6,496,540 B1 | 12/2002 | Windmer | 375/242 |
| 6,496,910 B1 | 12/2002 | Baentsch et al. | |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | 710/306 |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | |
| 6,587,112 B1 | 7/2003 | Goeltzenleuchter et al. | |
| 6,587,912 B2 | 7/2003 | Leddige | |
| 6,601,121 B2 | 7/2003 | Singh et al. | 710/112 |
| 6,611,905 B1 | 8/2003 | Grundon et al. | 711/167 |
| 6,622,217 B2 | 9/2003 | Gharschorloo et al. | 711/141 |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | 711/167 |
| 6,697,919 B2 | 2/2004 | Gharachorloo et al. | 711/141 |
| 6,704,842 B1 | 3/2004 | Janakiraman et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,839,393 B1 | 1/2005 | Sidiropoulos | 375/371 |
| 6,877,076 B1 | 4/2005 | Cho et al. | |
| 6,877,078 B2 | 4/2005 | Fujiwara et al. | |
| 6,889,284 B1 | 5/2005 | Nizar et al. | |
| 6,938,119 B2 | 8/2005 | Kohn et al. | |
| 6,949,950 B2 | 9/2005 | Takahashi et al. | |
| 6,977,536 B2 | 12/2005 | Chin-Chieh et al. | 327/116 |
| 7,133,972 B2 * | 11/2006 | Jeddeloh | 711/137 |
| 7,177,211 B2 | 2/2007 | Zimmerman | |
| 7,206,962 B2 | 4/2007 | Deegan | |
| 2001/0000822 A1 | 5/2001 | Dell et al. | 711/170 |
| 2001/0003839 A1 | 6/2001 | Kondo | |
| 2002/0019926 A1 | 2/2002 | Huppenthal et al. | 712/15 |
| 2002/0038405 A1 | 3/2002 | Leddige et al. | |
| 2002/0083255 A1 | 6/2002 | Greoff et al. | 710/305 |
| 2002/0103988 A1 | 8/2002 | Dornier | |
| 2002/0112119 A1 | 8/2002 | Halbert et al. | |
| 2002/0112194 A1 | 8/2002 | Uzelac | 713/500 |
| 2002/0124195 A1 | 9/2002 | Nizar | |
| 2002/0147898 A1 | 10/2002 | Rentschler et al. | |
| 2002/0174274 A1 | 11/2002 | Wu et al. | |
| 2003/0033364 A1 | 2/2003 | Garnett et al. | 709/203 |
| 2003/0056183 A1 | 3/2003 | Kobayahi | |
| 2003/0084309 A1 | 5/2003 | Kohn | 713/189 |
| 2003/0090879 A1 | 5/2003 | Doblar et al. | 361/728 |
| 2003/0126363 A1 * | 7/2003 | David | 711/118 |
| 2003/0223303 A1 | 12/2003 | Lamb et al. | 365/230.06 |
| 2003/0236959 A1 | 12/2003 | Johnson et al. | 711/167 |
| 2004/0006674 A1 | 1/2004 | Hargis et al. | 711/156 |
| 2004/0049723 A1 | 3/2004 | Obara | 714/729 |
| 2004/0098549 A1 | 5/2004 | Dorst | |
| 2004/0117588 A1 | 6/2004 | Arimilli et al. | |
| 2004/0128474 A1 | 7/2004 | Vorbach | 712/10 |
| 2004/0163028 A1 | 8/2004 | Olarig | |
| 2004/0205433 A1 | 10/2004 | Gower et al. | |
| 2004/0230718 A1 | 11/2004 | Polzin et al. | |
| 2004/0246767 A1 | 12/2004 | Vogt | 365/154 |
| 2004/0250153 A1 | 12/2004 | Vogt | |
| 2004/0260909 A1 | 12/2004 | Lee et al. | |
| 2004/0260957 A1 | 12/2004 | Jeddeloh et al. | |
| 2005/0023560 A1 | 2/2005 | Ahn et al. | 257/200 |
| 2005/0044457 A1 | 2/2005 | Jeddeloh | |
| 2005/0050237 A1 | 3/2005 | Jeddeloh | |
| 2005/0050255 A1 | 3/2005 | Jeddeloh | |
| 2005/0066136 A1 | 3/2005 | Schnepper | |
| 2005/0080581 A1 | 4/2005 | Zimmerman et al. | |
| 2005/0097249 A1 | 5/2005 | Oberlin et al. | |
| 2005/0120157 A1 | 6/2005 | Chen et al. | 710/313 |
| 2005/0125702 A1 | 6/2005 | Huang et al. | |
| 2005/0125703 A1 | 6/2005 | Lefurgy et al. | |
| 2005/0138267 A1 | 6/2005 | Bains et al. | |
| 2005/0144399 A1 | 6/2005 | Hosomi | |
| 2005/0166006 A1 * | 7/2005 | Talbot et al. | 711/105 |
| 2005/0177690 A1 | 8/2005 | LaBerge | |
| 2005/0204216 A1 | 9/2005 | Daily et al. | 714/724 |

| | | |
|---|---|---|
| 2005/0229132 A1 | 10/2005 | Butt et al. .................... 716/10 |
| 2005/0257005 A1 | 11/2005 | Jeddeloh |
| 2005/0259496 A1 | 11/2005 | Hsu et al. |
| 2006/0036826 A1 | 2/2006 | Dell et al. |
| 2006/0036827 A1 | 2/2006 | Dell et al. |

OTHER PUBLICATIONS

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Reapeaters in Bidirectional Buses;" IEEE Transactions on Computer-Aided Design of Integrated Circuits and Systems, vol. 25, No. 3, Mar. 2005, pp. 461-469.

Seceleanu et al.; "Segment Arbiter as Action System;" IEEE 2003 pp. 249-252.

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al "Guided Region Prefetching: A Cooperative Hardware/Software Approach", pp. 388-398.

Natarajan, et al "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Benini, Luca, et al. "System-Level Power Optimization: Techniques and Tools", ACM Transactions on Design Automation of Electronic Systems, vol. 6, No. 2, Apr. 2001, pp. 149-206.

Boudon, et al., "Novel Bus Reconfiguration Scheme With Spare Lines", IBM Technical Disclosure Bulletin, May 1987, vol. 29, No. 12, pp. 1-3.

Massoud Pedram, "Power Minimization in IC Design Principles and Applications", ACM Transactions on Design Automation of Electronic Systems vol. 1, No. 1, Jan. 1996, pp. 3-56.

JEDEC Solid State Technology Associatio, "JEDEC Standard: DDR2 SDRAM Specification", Jan. 2004, JEDEC, Revision JESD79-2A, p. 10.

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html.

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586 filed May 22, 2006. Robert Tremaine. "Systems and Methods for Providing Remote Pre-Fetch Buffers".

Understanding System Memory and CPU Speeds: A Layman's Guide to the Front Side Bus (FSB), [online], [retrieved on Feb. 23, 2006]; retrieved from the Internet, http://www.directron.com.fsbguide.html NB940259 (IBM Technical Disclosure Bulletin, Feb. 1994; vol. 37; pp. 59-64).

Wikipedia, Serial Communications, [online], [retrieved Apr. 10, 2007 from the Internet], http://en.wikipedia.org/wiki/Serial_communications, 3 pages.

IEEE, "IEEE Standard Test Acess Port and Boundary-Scan Architecture", Jul. 23, 2001, IEEE Std 1149-1-2001, pp. 11-13.

Rosenberg, "Dictionary of Computers, Information Processing & Telecommunications", Second Edition, John Wiley & Sons, Inc. 1987. 3 pgs.

\* cited by examiner

TYPICAL LARGE-SYSTEM MEMORY CONFIGURATION

| Downstream Format : 9 data – 8 cmd – 4 ecc – 1 spare – 1 diff clk = 24 TOTAL WIRES | | | | | | | | | | | | | | | | | | | | | | |
|---|---|---|---|---|---|---|---|---|---|---|---|---|---|---|---|---|---|---|---|---|---|---|
| us_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| s3_ds(#) | | | | | | | | | | | | | | | | | | | | | | |
| Xfer/Bit | spare | ecc0 | ecc1 | ecc2 | ecc3 | di0 | di1 | di2 | di3 | di4 | di5 | di6 | di7 | di8 | c0 | c1 | c2 | c3 | c4 | c5 | c6 | c7 |
| 0 | S0 | E00 | E10 | E20 | E30 | D00 | D10 | D20 | D30 | D40 | D50 | D60 | D70 | D80 | C00 | C10 | C20 | C30 | C40 | C50 | C60 | C70 |
| 1 | S1 | E01 | E11 | E21 | E31 | D01 | D11 | D21 | D31 | D41 | D51 | D61 | D71 | D81 | C01 | C11 | C21 | C31 | C41 | C51 | C61 | C71 |
| 2 | S2 | E02 | E12 | E22 | E32 | D02 | D12 | D22 | D32 | D42 | D52 | D62 | D72 | D82 | C02 | C12 | C22 | C32 | C42 | C52 | C62 | C72 |
| 3 | S3 | E03 | E13 | E23 | E33 | D03 | D13 | D23 | D33 | D43 | D53 | D63 | D73 | D83 | C03 | C13 | C23 | C33 | C43 | C53 | C63 | C73 |
| 4 | S4 | E04 | E14 | E24 | E34 | D04 | D14 | D24 | D34 | D44 | D54 | D64 | D74 | D84 | C04 | C14 | C24 | C34 | C44 | C54 | C64 | C74 |
| 5 | S5 | E05 | E15 | E25 | E35 | D05 | D15 | D25 | D35 | D45 | D55 | D65 | D75 | D85 | C05 | C15 | C25 | C35 | C45 | C55 | C65 | C75 |
| 6 | S6 | E06 | E16 | E26 | E36 | D06 | D16 | D26 | D36 | D46 | D56 | D66 | D76 | D86 | C06 | C16 | C26 | C36 | C46 | C56 | C66 | C66 |
| 7 | S7 | E07 | E17 | E27 | E37 | D07 | D17 | D27 | D37 | D47 | D57 | D67 | D77 | D87 | C07 | C17 | C27 | C37 | C47 | C57 | C67 | C67 |

S : Spare bits 1102

E : ECC check bits 1104

D : Write data bits 1106

C : Command bits 1108

FIG. 11

| s3_us(#) d3_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Xfer/Bit | spare | ecc0 | ecc1 | ecc2 | ecc3 | do0 | do1 | do2 | do3 | do4 | do5 | do6 | do7 | do8 | do9 | do10 | do11 | do12 | do13 | do14 | do15 | do16 | do17 |
| 0 | S0 | E00 | E10 | E20 | E30 | D00 | D10 | D20 | D30 | D40 | D50 | D60 | D70 | D80 | D90 | D100 | D110 | D120 | D130 | D140 | D150 | D160 | D170 |
| 1 | S1 | E01 | E11 | E21 | E31 | D01 | D11 | D21 | D31 | D41 | D51 | D61 | D71 | D81 | D91 | D101 | D111 | D121 | D131 | D141 | D151 | D161 | D171 |
| 2 | S2 | E02 | E12 | E22 | E32 | D02 | D12 | D22 | D32 | D42 | D52 | D62 | D72 | D82 | D92 | D102 | D112 | D122 | D132 | D142 | D152 | D162 | D172 |
| 3 | S3 | E03 | E13 | E23 | E33 | D03 | D13 | D23 | D33 | D43 | D53 | D63 | D73 | D83 | D93 | D103 | D113 | D123 | D133 | D143 | D153 | D163 | D173 |
| 4 | S4 | E04 | E14 | E24 | E34 | D04 | D14 | D24 | D34 | D44 | D54 | D64 | D74 | D84 | D94 | D104 | D114 | D124 | D134 | D144 | D154 | D164 | D174 |
| 5 | S5 | E05 | E15 | E25 | E35 | D05 | D15 | D25 | D35 | D45 | D55 | D65 | D75 | D85 | D95 | D105 | D115 | D125 | D135 | D145 | D155 | D165 | D175 |
| 6 | S6 | E06 | E16 | E26 | E36 | D06 | D16 | D26 | D36 | D46 | D56 | D66 | D76 | D86 | D96 | D106 | D116 | D126 | D136 | D146 | D156 | D166 | D176 |
| 7 | S7 | E07 | E17 | E27 | E37 | D07 | D17 | D27 | D37 | D47 | D57 | D67 | D77 | D87 | D97 | D107 | D117 | D127 | D137 | D147 | D157 | D167 | D177 |

Upstream Format: 18 data + 4 ecc + 1 spare + 1 diff clk = 25 TOTAL WIRES

S : Spare bits 1202
E : ECC check bits 1204
D : READ data bits 1206

FIG. 12

| COMMAND CATEGORY | COMMAND | PRIMARY COMMAND DECODES | TYPE |
|---|---|---|---|
| XFER 0 BITS (0:2) | | | |
| ACTIVE COMMANDS | XFER 3 BITS(3:4) | | |
| '111' | '00' | BANK ACTIVATE | 0:3 / 4:7 |
| '111' | '01' | BANK ACTIVATE W/PACKET READ | 0:6 |
| '111' | '10' | BANK ACTIVATE W/PACKET WRITE | 0:6 |
| PAGE AND MRS COMMANDS | | | |
| '110' | | MODE REGISTER SET | 0:3 / 4:7 |
| '101' | | PAGE WRITE | 0:3 / 4:7 |
| '100' | | PAGE READ | 0:3 / 4:7 |
| OTHER COMMANDS | XFER 1 BITS(3:5) | | |
| '011' | '000' | OTHER- PRECHARGE | 0:2 / 4:6 |
| '011' | '001' | OTHER- REFRESH | 0:2 / 4:6 |
| '011' | '010' | OTHER- ENTER POWER DOWN MODE | 0:2 / 4:6 |
| '011' | '011' | OTHER- EXIT POWER DOWN MODE | 0:2 / 4:6 |
| '011' | '100' | OTHER- ENTER SELF TIMED REFRESH | 0:2 / 4:6 |
| '011' | '101' | OTHER- EXIT SELF TIMED REFRESH | 0:2 / 4:6 |
| '011' | '110' | OTHER- DRAM CLOCK SYNC | 0:6 |
| '011' | '111' | OTHER- READ DATA RESPONSE | 0:2 / 4:6 |
| '010' | | RESERVED | NA |
| SLOW COMMANDS | BITS(3:4) | | |
| '001' | '00' | READ CONFIGURATION DATA BUFFER | SLOW |
| '001' | '01' | WRITE CONFIGURATION DATA BUFFER | SLOW |
| '001' | '10' | READ CONFIGURATION REGISTER TO BUFFER | SLOW |
| '001' | '11' | WRITE CONFIGURATION REGISTER TO BUFFER | SLOW |
| NO OPERATION | | | |
| '000' | | IDLE | 0:2 / 4:6 / 0:7 |

FIG. 14

| X0 | X1 | X2 | X3 | X4 | X5 | X6 | X7 |

| IDLE |||||||

| 0:6 ||||||| 7 |

| 0:3 |||| 4:7 ||||

| 0:3 |||| 4:6 ||| 7 |

| 0:2 ||| 3 | 4:7 ||||

| 0:2 ||| 3 | 4:6 ||| 7 |

FIG. 16

| BITS | XFER 0 | XFER 1 | XFER 2 | XFER 3 | XFER 4 | XFER 5 | XFER 6 | XFER 7 |
|---|---|---|---|---|---|---|---|---|
| 0 | '111' BANK ACTIVATE | BANK (0:2) | ROW ADD (5:12) | ROW ADD (13:15) | 'X' | 'X' | 'X' | 'X' |
| 1 | | | | | 'X' | 'X' | 'X' | 'X' |
| 2 | | | | | 'X' | 'X' | 'X' | 'X' |
| 3 | DIMM SELECT (0:2) | ROW ADD (0:4) | | '00' NO PACKET | 'X' | 'X' | 'X' | 'X' |
| 4 | | | | | 'X' | 'X' | 'X' | 'X' |
| 5 | RANK (0:1) | | | '0' | 'X' | 'X' | 'X' | 'X' |
| 6 | | | | '0' | | 'X' | 'X' | 'X' |
| 7 | | | | '0' | | | | 'X' |

FIG. 17

| BITS | XFER 0-7 | XFER 0-7 | XFER 0-7 |
|---|---|---|---|
| 0 | '000' IDLE | '001' SLOW COMMAND | '000' IDLE |
| 1 | | | |
| 2 | | | |
| 3 | '00' READ SLOW DATA BUFFER | '00' READ SLOW DATA BUFFER | '00' READ SLOW DATA BUFFER |
| 4 | | | |
| 5 | DIMM SELECT(0:2) | DIMM SELECT(0:2) | DIMM SELECT(0:2) |
| 6 | | | |
| 7 | | | |

FIG. 18

SYSTEM, METHOD AND STORAGE MEDIUM FOR A MEMORY SUBSYSTEM COMMAND INTERFACE

BACKGROUND OF THE INVENTION

The invention relates to a memory subsystem and in particular, to a memory subsystem command interface.

Computer memory subsystems have evolved over the years, but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pinout, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory system 10 that includes up to four registered dual inline memory modules (DIMMs) 40 on a traditional multi-drop stub bus channel. The subsystem includes a memory controller 20, an external clock buffer 30, registered DIMMs 40, an address bus 50, a control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EEPROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723,120. A memory controller 111 is connected to a memory bus 315, which further connects to a module 310a. The information on bus 315 is re-driven by the buffer on module 310a to the next module, 310b, which further re-drives the bus 315 to module positions denoted as 310n. Each module 310a includes a DRAM 311a and a buffer 320a. The bus 315 may be described as having a daisy chain structure, with each bus being point-to-point in nature.

One drawback to the use of a daisy chain bus is that the transmission of data and commands between a memory controller and a memory module may not be efficient when a single transmission occurs during each memory clock cycle and each transmission includes one command directed to a single memory module. Further, the format of the data and commands that are transmitted from the memory controller to the memory module may not be flexible in format, in that each command maps to a specific command bit(s) in the transmission file.

BRIEF SUMMARY OF THE INVENTION

Exemplary embodiments of the present invention include a cascaded interconnect system including one or more memory modules, a memory controller and a memory bus. The memory controller generates a data frame that includes a plurality of commands (where the idle command counts as a command). The memory controller and the memory module are interconnected by a packetized multi-transfer interface via the memory bus and the frame is transmitted to the memory modules via the memory bus.

Additional exemplary embodiments include a method for a memory subsystem command interface. The method includes receiving an input signal containing a plurality of commands at a current memory module. The current memory module is included in a cascaded interconnect system that includes a memory controller and one or more memory modules that are interconnected via a memory bus. One or more of the commands are executed in response to the one or more commands being directed to the current memory module.

Further exemplary embodiments include a storage medium for providing a memory subsystem command interface. The storage medium is encoded with machine readable computer program code for causing a computer to implement a method. The method includes receiving an input signal containing a plurality of commands at a current memory module. The current memory module is included in a cascaded interconnect system that includes a memory controller and one or more memory modules that are interconnected via a memory bus. One or more of the commands are executed in response to the one or more commands being directed to the current memory module.

BRIEF DESCRIPTION OF THE DRAWINGS

Referring now to the drawings wherein like elements are numbered alike in the several FIGURES:

FIG. 11 depicts a downstream frame format that is utilized by exemplary embodiments of the present invention;

FIG. 12 depicts an upstream frame format that is utilized by exemplary embodiments of the present invention;

FIG. 14 is a table of primary command bus decodes that are utilized by exemplary embodiments of the present invention;

FIG. 16 depicts command combinations that may be utilized by exemplary embodiments of the present invention;

FIG. 17 is a sample command decode for a bank activate command that may be utilized by exemplary embodiments of the present invention; and FIG. 18 is a sample command decode for a read slow data buffer command that may be utilized by exemplary embodiments of the present invention.

DETAILED DESCRIPTION OF THE PREFERRED EMBODIMENTS

Exemplary embodiments of the present invention provide the ability for multiple memory operations to be executed in parallel to maximize memory subsystem bandwidth and system performance. The command structure described herein permits several commands to be issued in a single packet, or frame. Commands that do not require all transfers of a given frame are formatted to allow other commands to be optionally issued at the same time (i.e., within the given frame).

In an exemplary embodiment of the present invention, the memory subsystem command interface is provided by a high speed and high reliability memory subsystem architecture and interconnect structure that includes single-ended point-to-point interconnections between any two subsystem components. The memory subsystem further includes a memory control function, one or more memory modules, one or more high speed busses operating at a four-to-one speed ratio relative to a DRAM data rate and a bus-to-bus converter chip on each of one or more cascaded modules to convert the high speed bus(ses) into the conventional double data rate (DDR) memory interface. The memory modules operate as slave devices to the memory controller, responding to commands in a deterministic or non-deterministic manner, but do not self-initiate unplanned bus activity, except in cases where operational errors are reported in a real-time manner. Memory modules can be added to the cascaded bus, with each module assigned an address to permit unique selection of each module on the cascaded bus. Exemplary embodiments of the present invention include a packetized multi-transfer interface which utilizes an innovative communication protocol to permit memory operation to occur on a reduced pincount, whereby address, command and data is transferred between the components on the cascaded bus over multiple cycles, and are reconstructed and errors corrected prior to being used by the intended recipient.

Figure 1:
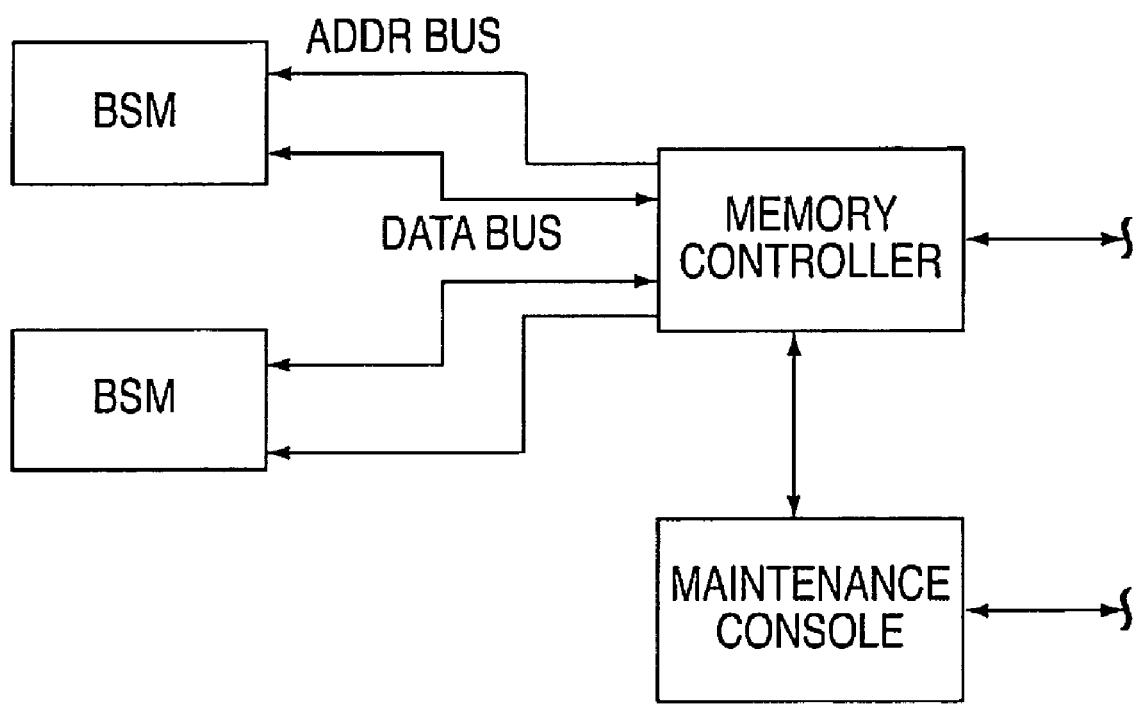
FIG. 1 depicts a prior art memory controller connected to two buffered memory assemblies via separate point-to-point links.
Figure 2:
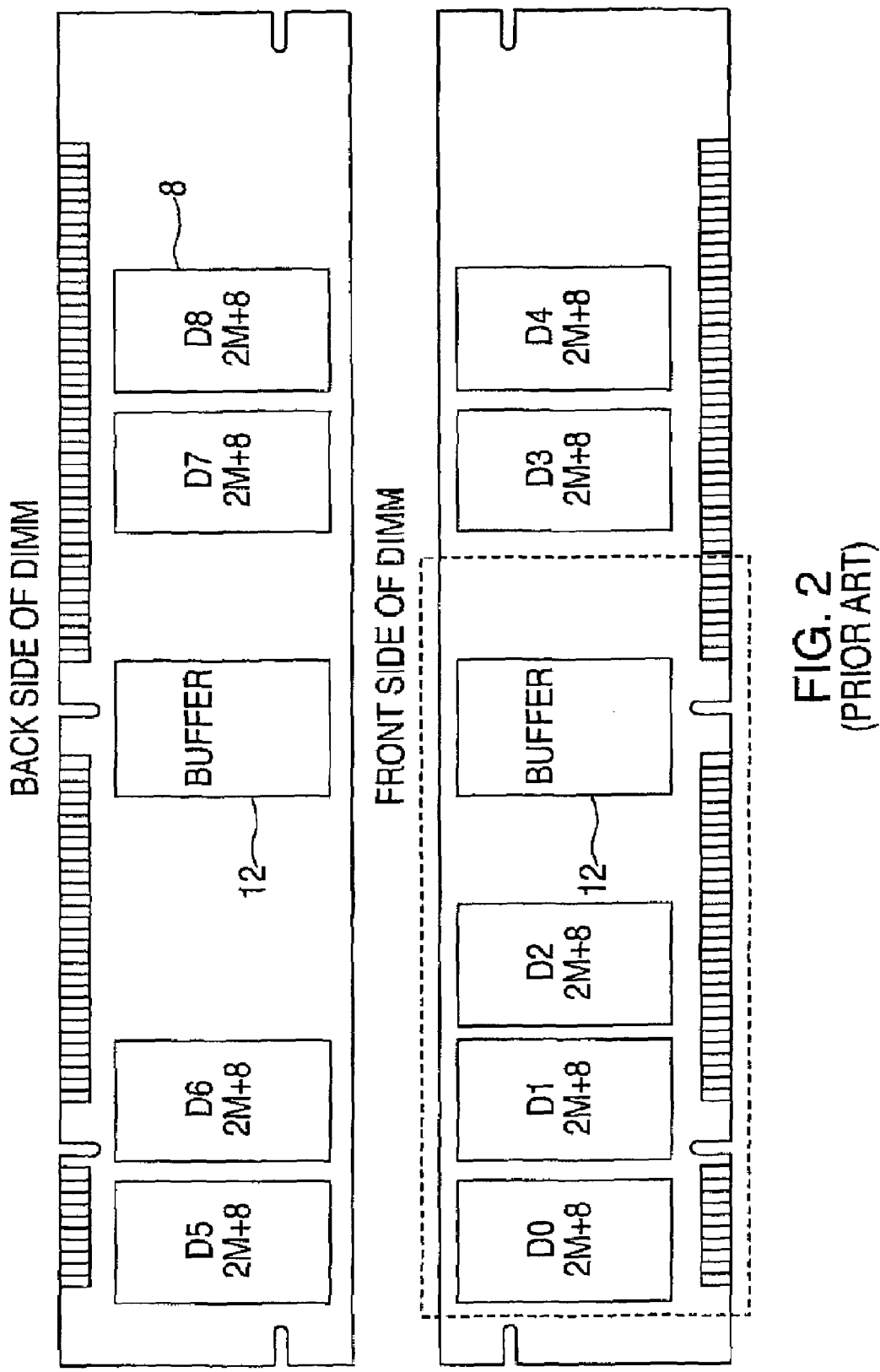
FIG. 2 depicts a prior art synchronous memory module with a buffer device.
Figure 3:
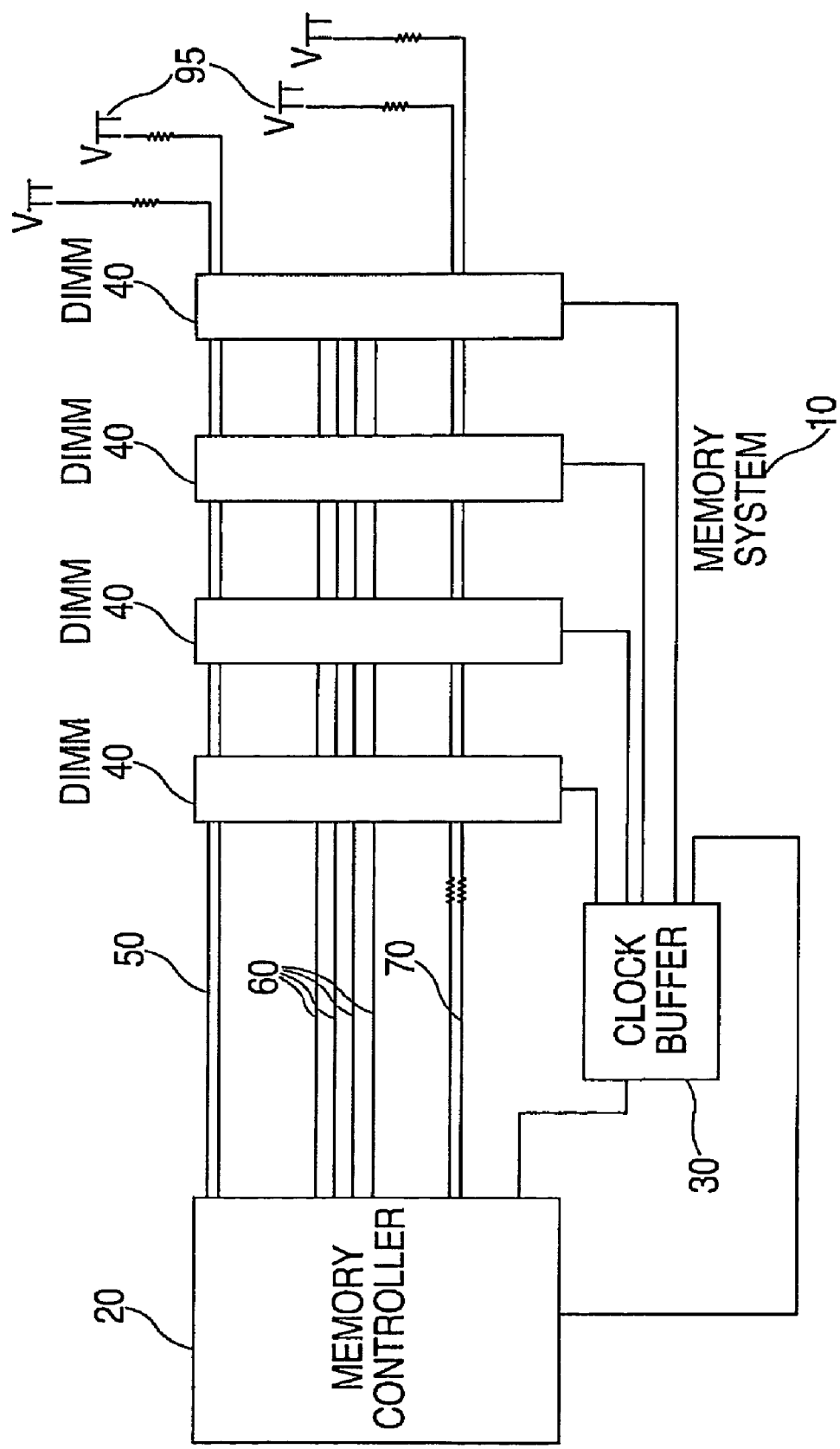
FIG. 3 depicts a prior art memory subsystem using registered DIMMs.
Figure 4:
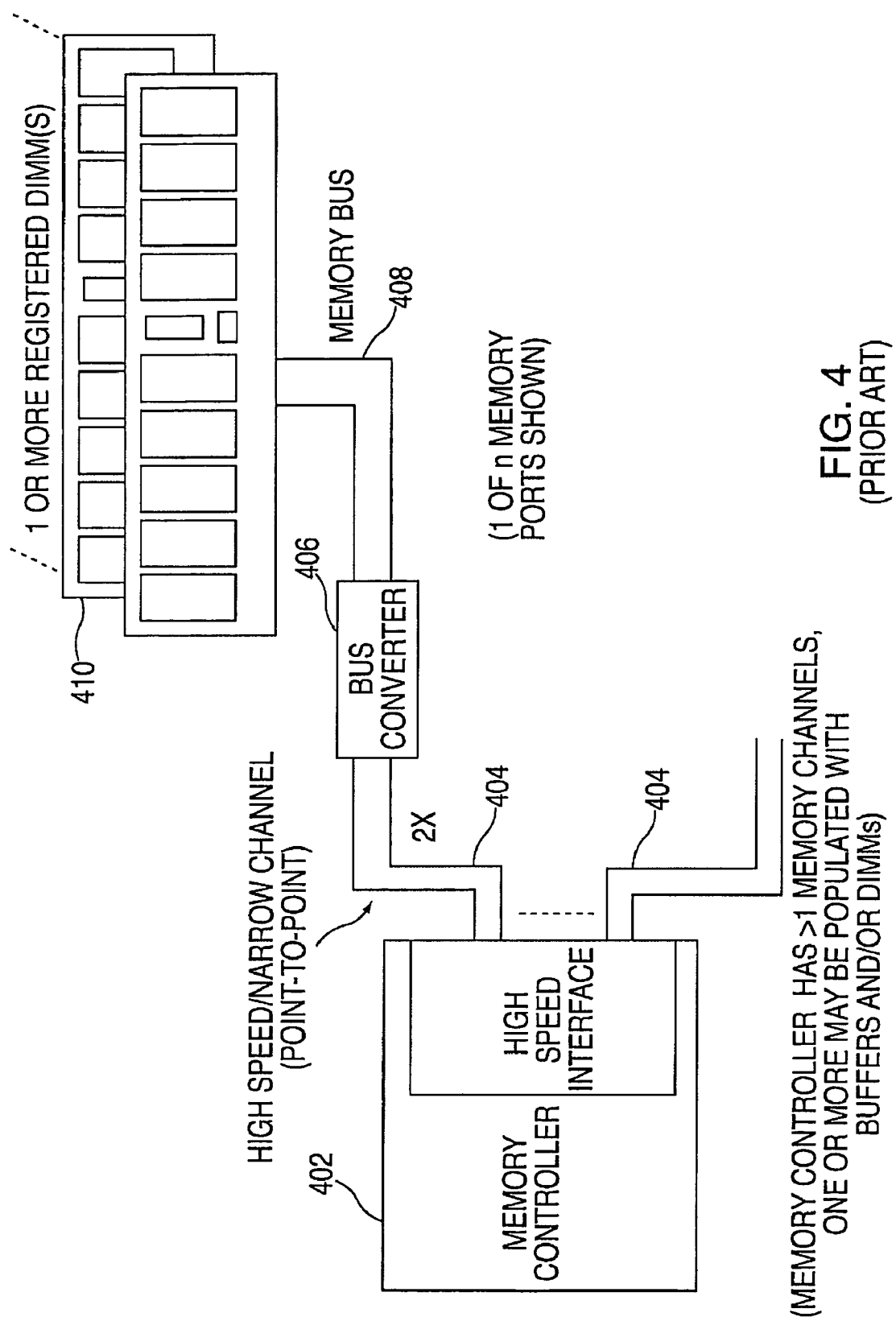
FIG. 4 depicts a prior art memory subsystem with point-to-point channels, registered DIMMs, and a 2:1 bus speed multiplier.
Figure 5:
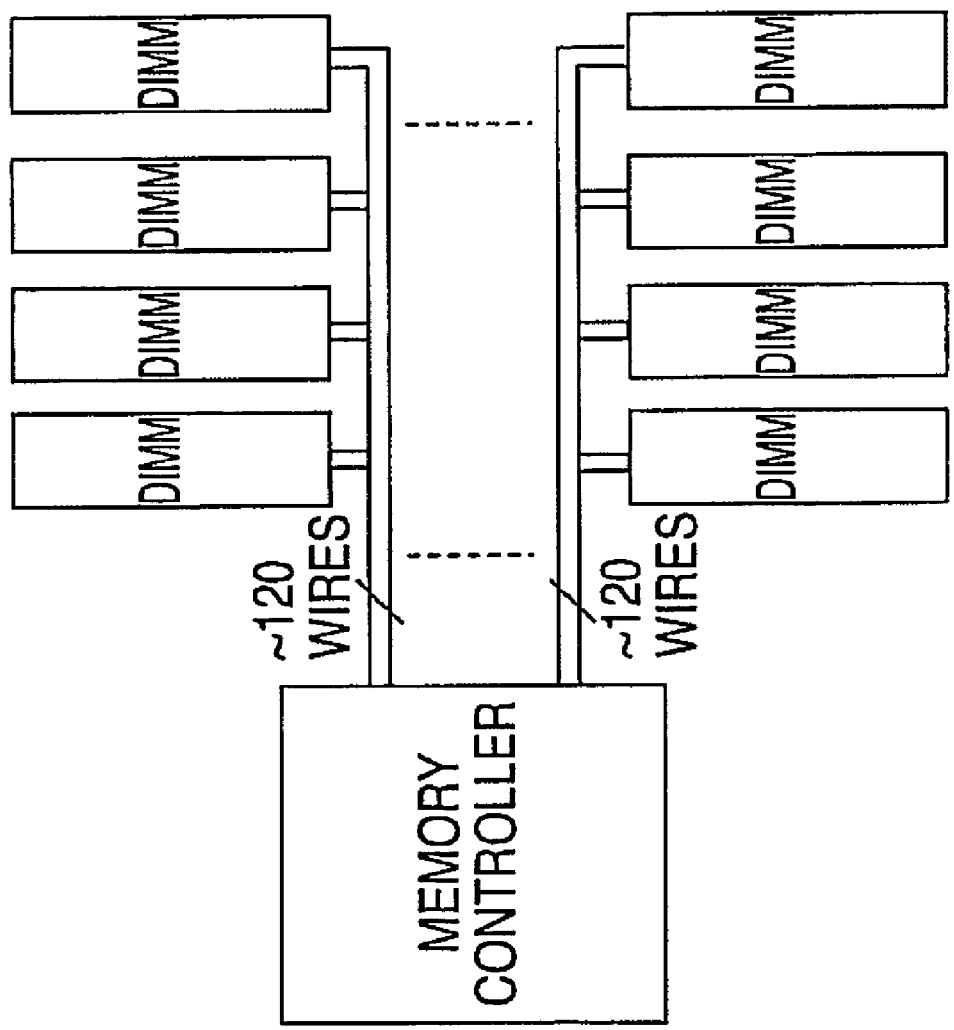
FIG. 5 depicts a prior art memory structure that utilizes a multidrop memory 'stub' bus.
Figure 6:
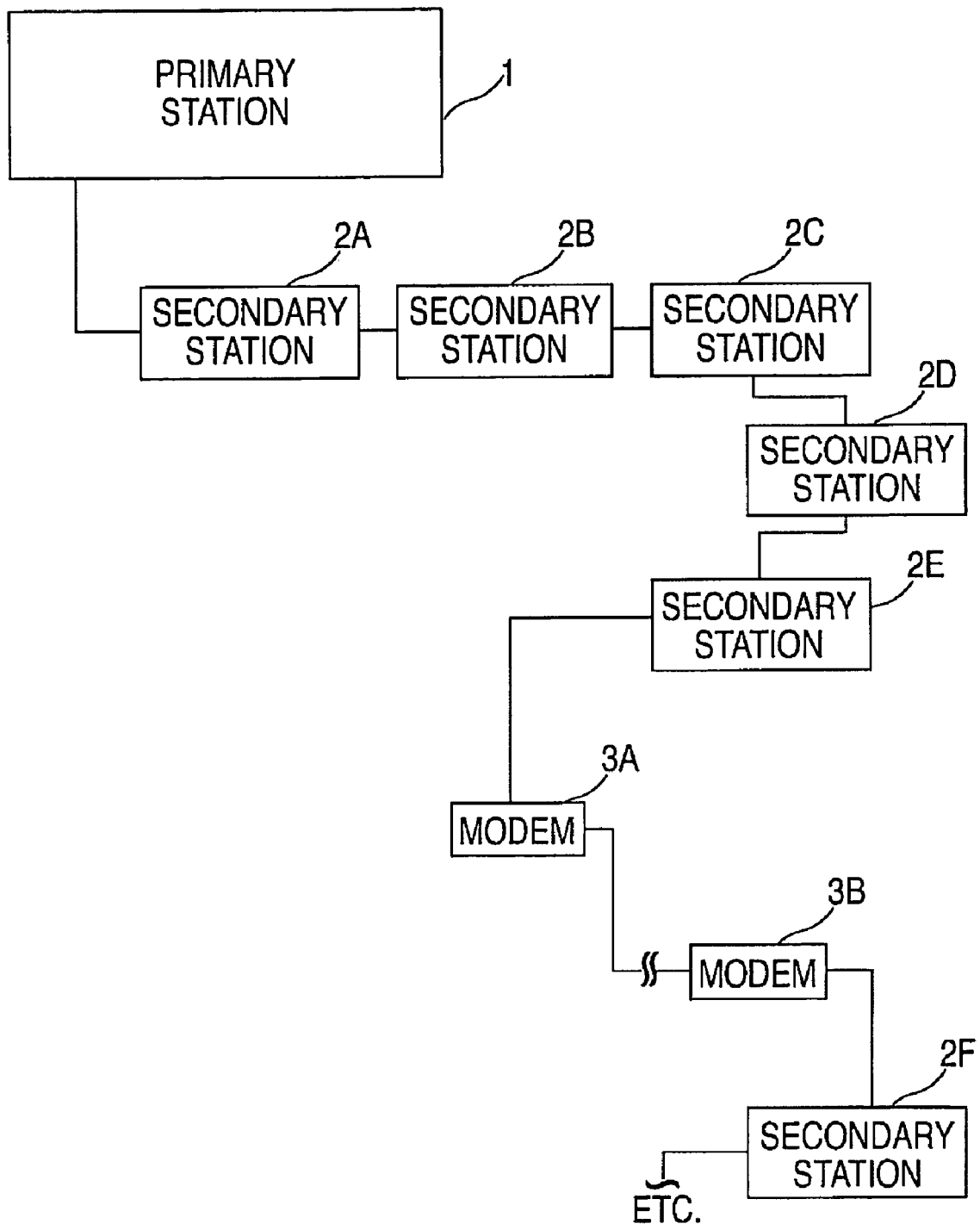
FIG. 6 depicts a prior art daisy chain structure in a multipoint communication structure that would otherwise require multiple ports.
Figure 7:
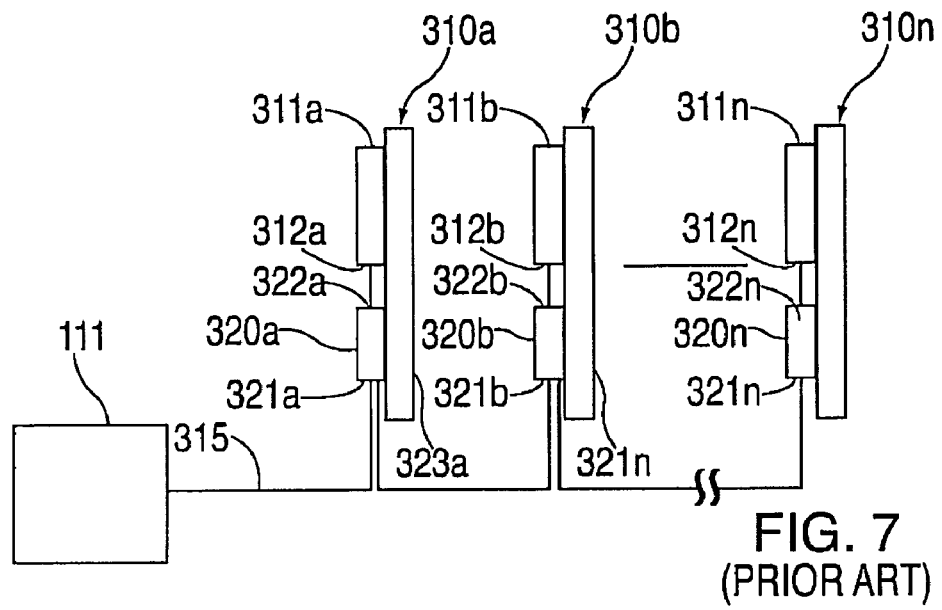
FIG. 7 depicts a prior art daisy chain connection between a memory controller and memory modules.
Figure 8:
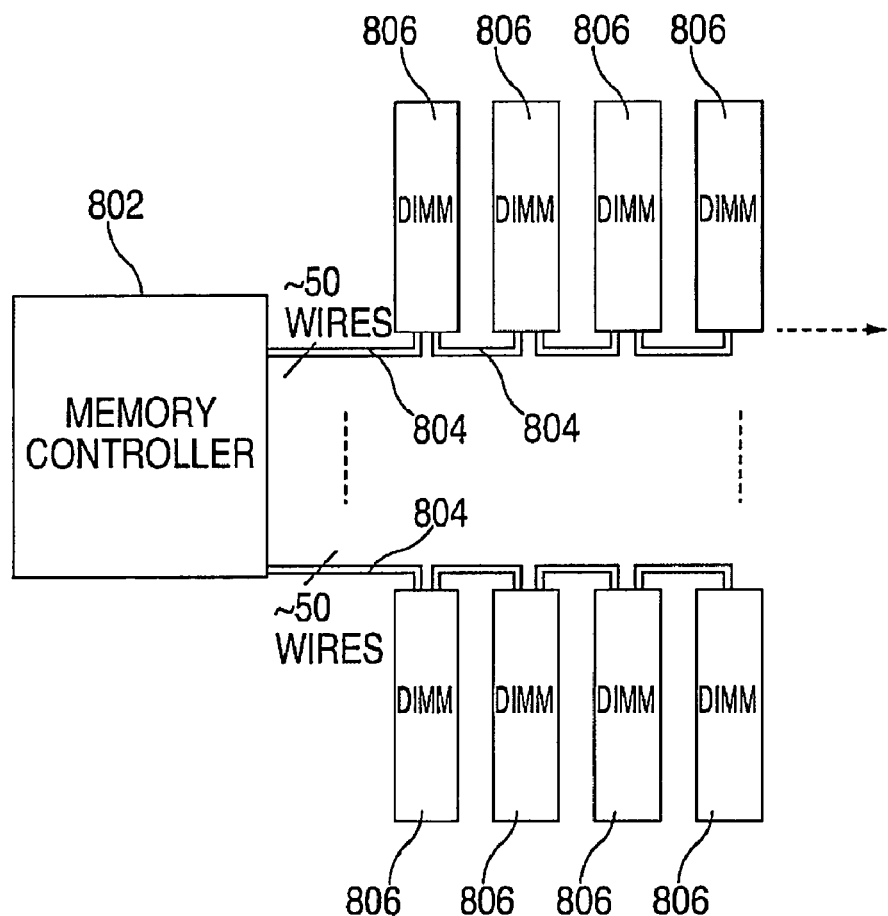
FIG. 8 depicts a cascaded memory structure that is utilized by exemplary embodiments of the present invention.

FIG. 8 depicts a cascaded memory structure that may be utilized by exemplary embodiments of the present invention when buffered memory modules 806 (e.g., the buffer device is included within the memory module 806) are in communication with a memory controller 802. This memory structure includes the memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and to minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module. The bus re-drive function permits memory modules to be cascaded such that each memory module is interconnected to other memory modules, as well as to the memory controller 802.

Figure 9:
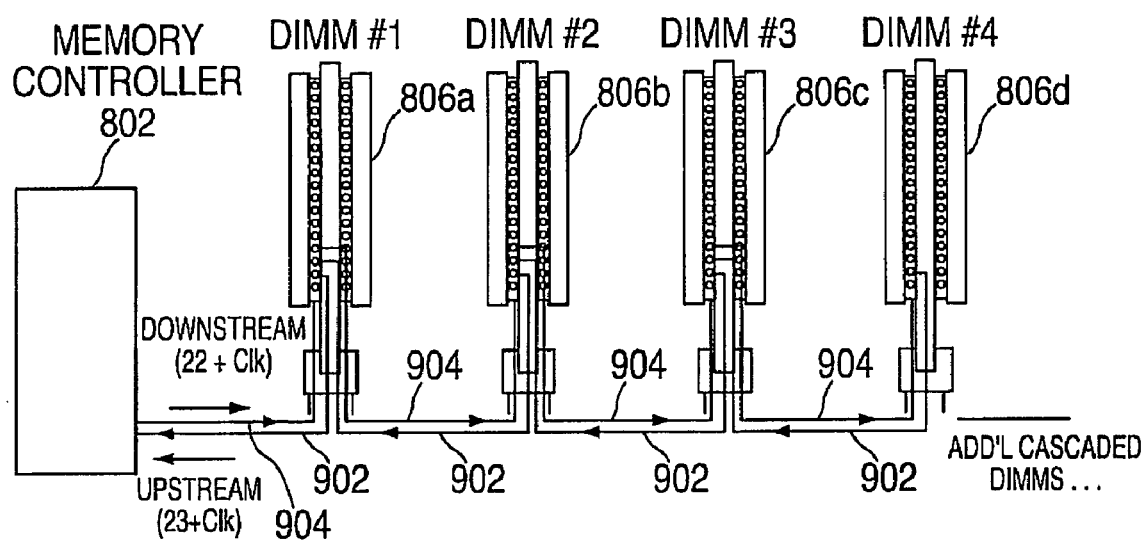
FIG. 9 depicts a memory structure with cascaded memory modules and unidirectional busses that is utilized by exemplary embodiments of the present invention.

FIG. 9 depicts a memory structure with cascaded memory modules and unidirectional busses that is utilized by exemplary embodiments of the present invention. One of the functions provided by the memory modules 806 in the cascade structure is a re-drive function to send signals on the memory bus to other memory modules 806 or to the memory controller 802. FIG. 9 includes the memory controller 802 and four memory modules 806*a*, 806*b*, 806*c* and 806*d*, on each of two memory busses (a downstream memory bus 904 and an upstream memory bus 902), connected to the memory controller 802 in either a direct or cascaded manner. Memory module 806*a* is connected to the memory controller 802 in a direct manner. Memory modules 806*b*, 806*c* and 806*d* are connected to the memory controller 802 in a cascaded manner.

An exemplary embodiment of the present invention includes two unidirectional busses between the memory controller 802 and memory module 806*a* ("DIMM #1"), as well as between each successive memory module 806*b*-*d* ("DIMM #2", "DIMM #3" and "DIMM #4") in the cascaded memory structure. The downstream memory bus 904 is comprised of twenty-two single-ended signals and a differential clock pair. The downstream memory bus 904 is used to transfer address, control, write data and bus-level error code correction (ECC) bits downstream from the memory controller 802, over several clock cycles, to one or more of the memory modules 806 installed on the cascaded memory channel. The upstream memory bus 902 is comprised of twenty-three single-ended signals and a differential clock pair, and is used to transfer read data and bus-level ECC bits upstream from the sourcing memory module 806 to the memory controller 802. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Figure 10:
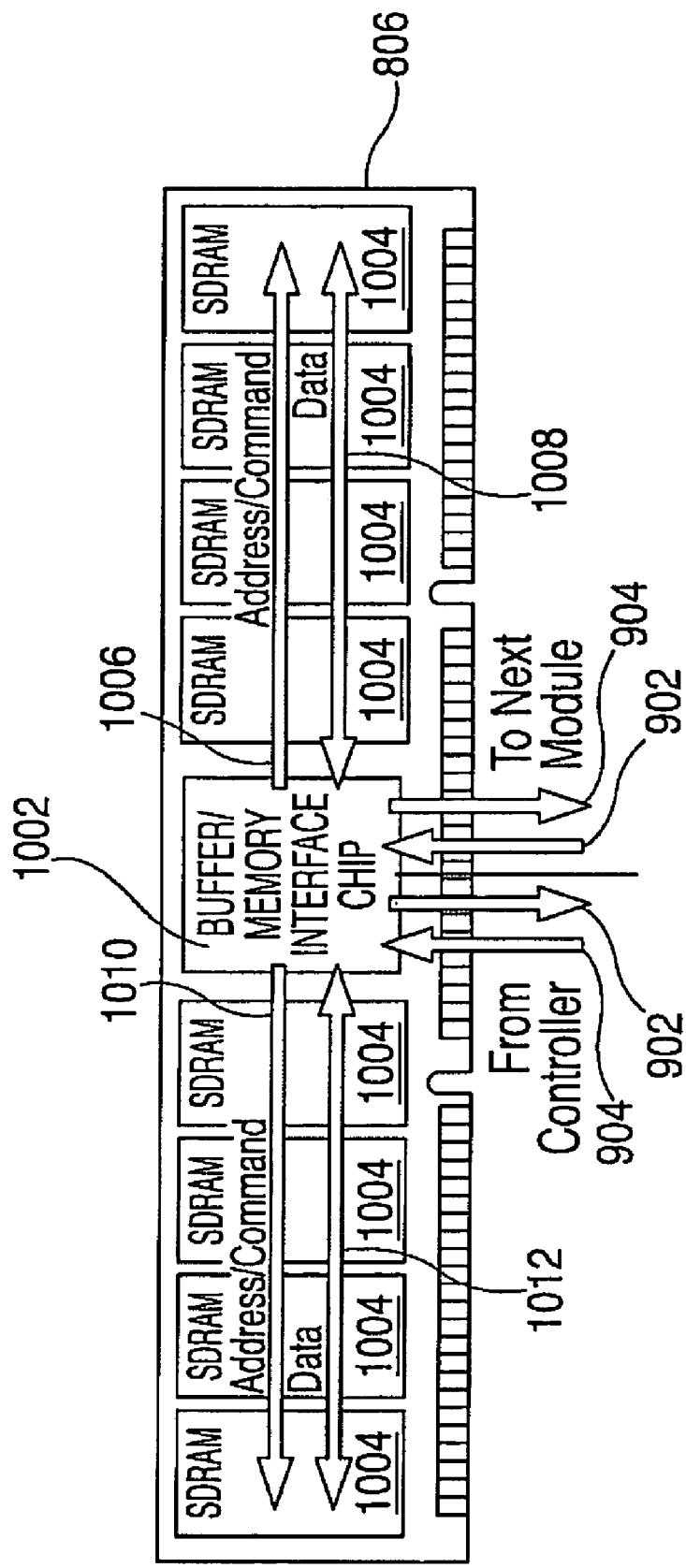
FIG. 10 depicts a buffered module wiring system that is utilized by exemplary embodiments of the present invention.

FIG. 10 depicts a buffered module wiring system that is utilized by exemplary embodiments of the present invention. FIG. 10 is a pictorial representation of a memory module, with the arrows representing the primary signal flows. The signal flows include the upstream memory bus 902, the downstream memory bus 904, memory device address and command busses 1010 and 1006, and memory device data busses 1012 and 1008. In an exemplary embodiment of the present invention, a buffer device 1002, also referred to as a memory interface chip, provides two copies of the address and command signals to SDRAMs 1004 with the right memory device address and command bus 1006 exiting from the right side of the buffer device 1002 for the SDRAMs 1004 located to the right side and behind the buffer module 1002 on the right. The left memory device address and command bus 1010 exits from the left side of the buffer device 1002 and connects to the SDRAMs 1004 to the left side and behind the buffer device 1002 on the left. Similarly, the data bits intended for SDRAMs 1004 to the right of the buffer device 1002 exit from the right of the buffer device 1002 on the right memory device data bus 1008. The data bits intended for the left side of the buffer device 1002 exit from the left of the buffer device 1002 on the left memory device data bus 1012. The high speed upstream memory bus 902 and downstream memory bus 904 exit from the lower portion of the buffer device 1002, and connect to a memory controller or other memory modules either upstream or downstream of this memory module 806, depending on the application. The buffer device 1002 receives signals that are four times the memory module data rate and converts them into signals at the memory module data rate.

The memory controller 802 interfaces to the memory modules 806 via a pair of high speed busses (or channels). The downstream memory bus 904 (outbound from the memory controller 802) interface has twenty-four pins and the upstream memory bus 902 (inbound to the memory controller 802) interface has twenty-five pins. The high speed channels each include a clock pair (differential), a spare bit lane, ECC syndrome bits and the remainder of the bits pass information (based on the operation underway). Due to the cascaded memory structure, all nets are point-to-point, allowing reliable high-speed communication that is independent of the number of memory modules 806 installed. Whenever a memory module 806 receives a packet on either bus, it re-synchronizes the command to the internal clock and re-drives the command to the next memory module 806 in the chain (if one exists).

FIG. 11 depicts a downstream frame format that is utilized by exemplary embodiments of the present invention to transfer information downstream from the memory controller 802 to the memory modules 806. In an exemplary embodiment of the present invention, the downstream frame consists of eight transfers, with each transfer including twenty-two signals and a differential clock (twenty-four wires total). The frame further consists of eight command wires (c0 through c7) 1108, nine data wires (di0 through di8) 1106, four bus error correction code (ECC) wires (ecc0 through ecc3) 1104 and a spare wire (spare) 1102. The seventy-two data bits are shown in FIG. 11 as bits di0 through di8, and consist of nine wires with eight transfers on each wire for each frame. In exemplary embodiments of the present invention, the frame format depicted in FIG. 11 may be utilized to deliver one to four memory commands plus seventy-two bits of write data per memory clock cycle. The numbering of each data bit, as well as for other bits, is based on the wire used, as well as the specific transfer. D34 refers to data bit 3 (of bits 0 through 8) and transfer 4 (of transfer 0 through 7). The command bit field is shown as c0 through c7, and consists of sixty-four bits of information provided to the module over eight transfers.

The ECC bit field (ecc0 through ecc3) consists of thirty-two bit positions over eight transfers, but is actually formatted in groups of sixteen bits. Each sixteen bit packet consists of four transfers over each of the four wires, and provide the bus level fault detection and correction across each group of four bus transfers. The spare bit position may be used to logically replace any of the other twenty-one wires, also defined as bitlanes, used to transfer bits in the command, data and ECC fields, should a failure occur in one of the bitlanes that results in exceeding a system-assigned failure threshold limit. The spare wire may be utilized to replace a failing segment between any two directly connected assemblies (i.e., between the memory controller 802 and the memory module 806*a*, or between any two memory modules 806*a*-*d*), to replace a wire due to events, such as a wire failure, a connector failure, a solder interconnect failure, a driver failure and/or a receiver failure. Out of the one hundred and seventy-six possible bit positions, one hundred and sixty-eight are available for the transfer of information to the memory module 806, and of those one hundred and sixty-eight bit positions, thirty-two bit positions are further assigned to providing ECC protection on the bus transfers themselves, thereby allowing a total of one hundred and thirty-six bit positions to be used for the transfer of information to the memory module 806. The frame format depicted in FIG. 11 is applicable to incoming signals to a memory module 806, from the direction of the memory controller, as well as the outgoing signals to any downstream memory modules 806.

FIG. 12 depicts an upstream frame format that is utilized by exemplary embodiments of the present invention to transfer information upstream from a memory module 806 to either the memory controller 802 or an upstream memory module 806. In an emplary embodiment of the present invention, the upstream frame consists of eight transfers, with each transfer including twenty-three signals and a differential clock (twenty-five wires total). The frame further consists of eighteen data wires (do0 through do17) 1206, four bus ECC wires (ecc0 through ecc3) 1204 and a spare wire (spare) 1202. In exemplary embodiments of the present invention, the frame format depicted in FIG. 12 may be utilized to deliver one hundred and forty-four read data bits per memory clock cycle. The numbering of each data bit, as well as for other bits, is based on the wire used as well as the specific transfer. D34 refers to data bit 3 (of bits 0 through 17) and transfer 4 (of transfer 0 through 7).

The ECC bit field (ecc0 through ecc3) consists of thirty-two bit positions over eight transfers, but is actually formatted in groups of sixteen bits. Each sixteen bit packet consists of four transfers over each of the four wires with error correction being performed every four transfers. The bus level error correcting code fault detection and correction is performed by a logic block that includes instructions to carry out the detection and correction. The spare wire position may be used to logically replace any of the other twenty-two wires used to transfer bits in the data and ECC fields should a failure occur in one of these wires that is consistent in nature. A failure may be considered to be consistent in nature if it exceeds a system dependent threshold value (e.g., number of times the failure is detected). Single bitlane failures may be corrected on the fly by the bus level ECC, while a system service element, such as a service processor, may decide to spare out a failing segment to repair hard (e.g., periodic, repeating and continuous) failures that may occur during system operation. The spare wire may be utilized to replace a failing segment between any two directly connected assemblies (i.e., between the memory controller 802 and the memory module 806a, or between any two memory modules 806a-d), to replace a wire due to any purpose, such as wire failure, a connector failure, a solder interconnect failure, a driver failure and/or a receiver failure. Out of the one hundred and eighty-four possible bit positions, one hundred and seventy-six are available for the transfer of information to the memory module 806, and of those one hundred and seventy-six bit positions, thirty-two bit positions are further assigned to providing ECC protection on the bus transfers themselves, thereby allowing a total of one hundred and forty-four bit positions to be used for the transfer of information to an upstream memory module 806 or to the memory controller 802.

Figure 13:
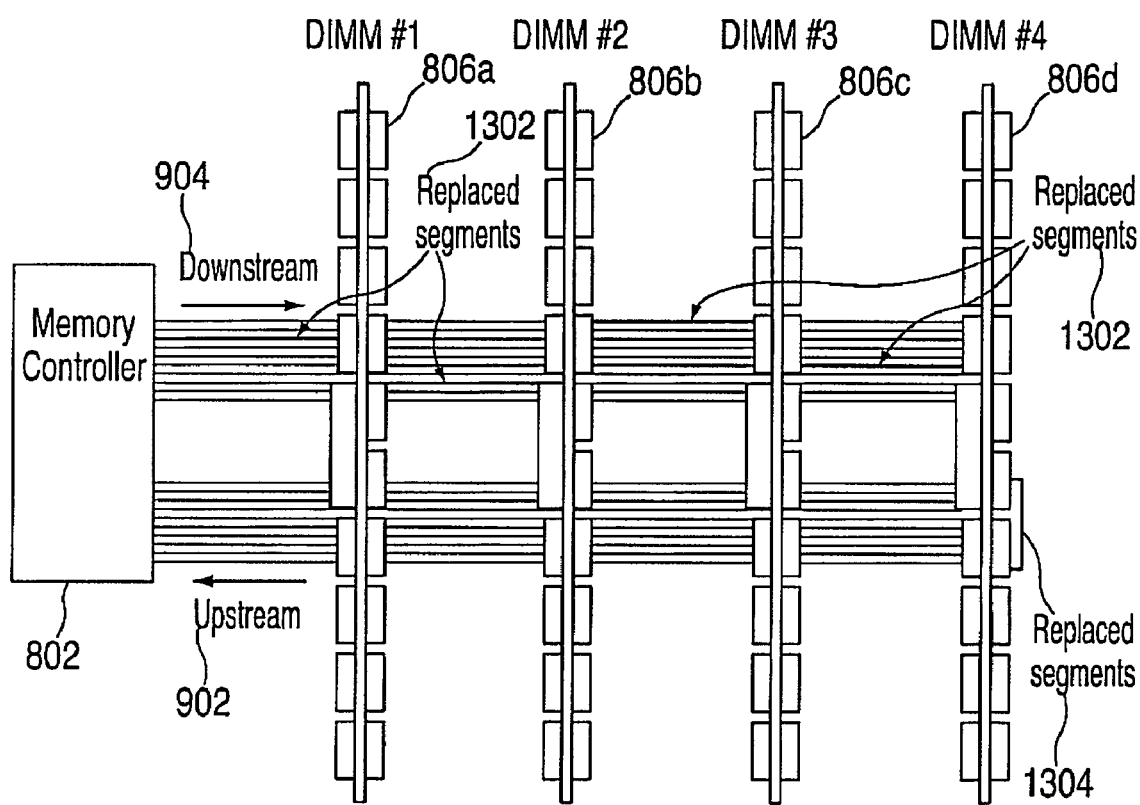
FIG. 13 depicts a cascaded bus structure with segment sparing that is utilized by exemplary embodiments of the present invention.

Exemplary embodiments of the present invention maximize memory subsystem survivability in the event of more than one failing interconnect between the memory controller 802 and the first memory module 806, as well as between any two interconnected memory modules 806 in the subsystem. FIG. 13 depicts a cascaded module bus structure with segment level sparing that is utilized by exemplary embodiments of the present invention. FIG. 13 includes a simplified drawing of a memory subsystem that includes the memory controller 802, a cascaded downstream memory bus 904, a cascaded upstream memory bus 902, four memory modules 806a-d (with more or less permissible), and a series of replaced segments 1302 that comprise unique wires between every two assemblies on the downstream memory bus 904.

The cascaded and repowered nature of the buffered memory module 806 architecture results in independent memory command and data busses on each memory module 806 in the channel. This structure allows multiple memory operations to be performed simultaneously on each of the independently repowered memory interfaces. The memory controller interface data and command structures are formatted into serialized frames with the same duration as a memory clock period. The frame format utilized by exemplary embodiments of the present invention allow multiple memory operations to be executed in parallel to maximize memory subsystem bandwidth and system performance.

Exemplary embodiments of the interface command structure protocol and frame format are further enhanced to optimize DRAM operation in both "open" and "closed" page policies. In an open page policy, the memory controller 802 will generally leave memory pages open (memory pages left "active" or "active-standby"), or even open pages based on prediction logic, in hopes that a subsequent access will occur to the same row address (page). This method works well when memory accesses have a high degree of locality, and can serve as a low-cost cache structure. The command protocol utilized by exemplary embodiments of the present invention include frames that allow multiple memory "bank activate", "write", and "read" commands to be issued in a single memory clock cycle. In addition, the command protocol structure is designed to accommodate "closed" page policies, where the memory being accessed is precharged immediately after the access is complete. The memory controller interface protocol includes packeted command frames that include both a "bank activate", as well as an associated "write" or "read" command that is targeted to the same rank of memory devices.

Further, the interface command structure and protocol may utilize all data fields, or command bits, in all transfers, thereby permitting up to four commands to be issued in a single packet. Commands that do not require all transfers of a given frame are formatted to allow other commands (e.g., secondary commands) to be optionally issued at the same time.

FIG. 14 is a table of primary command bus decodes that are utilized by exemplary embodiments of the present invention. The table in FIG. 14 includes four columns: a command category 1412, a command column 1414, a primary command decode column 1416 and a type column 1418. The command category column 1412 includes the value of bits zero, one and two in the first transfer (referred to as transfer zero in FIG. 11) containing the command, where the value of the bits determines the type, or category, of the command. Bit zero corresponds to the first bit, labeled "c0" (i.e., signal 14) in the command wires 1108 in FIG. 11, bit one corresponds to the bit labeled "c1", bit two to the bit labeled "c2", etc. As shown in FIG. 14, example command categories include activate commands 1402, page and mode register set (MRS) commands 1404, other commands 1406, slow commands 1408 and a no operation command 1410. The command column 1414 includes the value of bits that are utilized to determine which command within the command category is being selected. For example, the command for an activate command category may be one of bank activate, bank activate with packet read or bank activate with packet write, based on the values in the command bits (in the case of an activate command 1402 bits three and four of the fourth transfer (referred to as transfer three) in the frame).

The primary command decode column 1416 contains the value of the command corresponding to the command category column 1412 and the command column 1414. The type column 1418 specifies the length and possible locations of the command in a frame being transferred. For example, the bank activate command may be located in transfers zero through three of a frame and/or in transfers four to seven of the frame. In contrast, the bank activate with packet read command and the bank activate with packet write command may only be located in transfers zero through six of a frame. In exemplary embodiments of the present invention, the bank activate with packet read command specifies the column address in transfers four and five and a read delay in transfer six.

For example, if the command starts in transfer zero, then "C00"="1", "C10"="1" and "C20"="1" for an activate type of command. In addition, "C33"="0" and "C34"="0" for a bank activate command. Bank activate commands, like all 0:3/4:7 and 0:2/4:6 commands, may start in transfer zero and/or transfer four of a frame.

Figure 15:
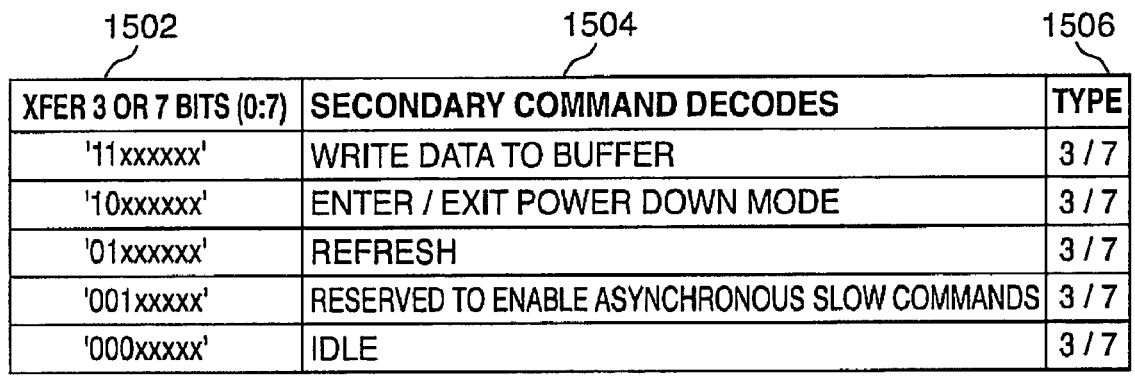
FIG. 15 is a table of secondary command bus decodes that are utilized by exemplary embodiments of the present invention.

FIG. 15 depicts a summary of secondary command bus decodes that may be utilized by exemplary embodiments of the present invention. In general, secondary commands do not require an address field and only require one transfer within the frame. The table in FIG. 15 includes a bit value column 1502 that specifies the contents of bits zero through seven for various secondary commands during transfer three or seven of a data frame. The secondary command decode column 1504 translates the bits into a secondary command. The secondary command type column 1506 specifies the transfers that may contain each secondary command. All of the exemplary commands depicted in the table require one transfer and may be located in transfer three and/or transfer seven of a frame. For example, the write to buffer command is specified by a "11" located in bits zero and one, a buffer address may be specified in bits two to four and a memory module 806 specified in bits five through seven. In another example, an enter power down mode command may be specified by a "100" located in bits zero through two, a rank specified in bits three and four, and a memory module 806 specified in bits five through seven.

FIG. 16 depicts command combinations that may be utilized by exemplary embodiments of the present invention. As described previously, commands that do not require all eight transfers within a frame may be combined with other commands in the same frame. The commands in a single frame may be directed to the same or different memory modules 806. As shown in FIG. 16, an idle command 1604 may be the only active command. A command requiring transfers zero through six (e.g., bank activate with packet read, bank activate with packet write, and DRAM clock synchronization) may be combined with a command requiring transfer seven (e.g., write to data buffer, enter power down mode, and refresh). A command requiring transfers zero through three (e.g., bank activate, and page write) may be combined with a command requiring transfers four to seven (e.g., bank activate, and page write). Also shown in FIG. 16, a command requiring transfers zero to three may be combined with a command requiring transfers four to six (enter self timed refresh, read data response) and another command requiring transfer seven (e.g., refresh, and write to data buffer). Other combinations (e.g., those shown in FIG. 16) may be implemented by exemplary embodiments of the present invention. Further flexibility is enabled by supporting the SDRAM refresh command as both primary commands (0:2/4:6) and as secondary commands (3/7).

FIG. 17 is a sample command decode for a bank activate command that may be utilized by exemplary embodiments of the present invention. Transfer zero includes "111" in bits zero through two, a memory module 806 selection in bits three through five and a rank selection in bits six through seven. Transfer one includes a bank selection in bits zero through two and the first five bits of a row address in bits three through seven. Transfer two includes the next eight bits of the row address. Transfer three includes the last three bits of the row address in bits zero through two, a "00" in bits three and four signifying no packet and zeros in bits five through seven. This leaves transfers four through seven available for other commands in configurations, such as those shown in FIG. 16.

FIG. 18 is a sample command decode for a read slow data buffer command that may be utilized by exemplary embodiments of the present invention. Slow commands may be utilized to access internal memory module registers. Because a limited number of address and data bits may be transferred during a slow command, a slow data buffer is used to temporarily store subsets of data that are ultimately transferred to and from internal memory module 806 registers. The read slow data buffer command depicted in FIG. 18 requires three frames. The first frame includes a "000" in bits zero through two to signify an idle, a "00" in bits three and four to signify a read slow data buffer command and a memory module 806 selection in bits five through seven. The same data is included in all eight transfers within the frame. The second frame includes the same data as the first frame, except for a "001" in bits zero through two to signify a slow command. Again, the same data is included in all eight transfers within the frame. The third frame includes the same data as the first frame. In this way all bits other than bit two itself: setup to, hold past and are qualified by, the activation of bit two. The bit line associated with bit two is monitored to detect a transition from one state to another (e.g., from a "0" to a "1"). This enables slow commands to be executed prior to the upstream and downstream initialization and alignment procedure.

Example commands, combinations of commands within a frame and placement of bits within frame transfers for example commands have been described herein. Other commands, combinations and placements may be implemented without departing from the scope of the present invention.

Exemplary embodiments of the present invention provide the ability for multiple memory operations to be executed in parallel to maximize memory subsystem bandwidth and system performance. If a command does not utilize all transfers within a frame, then another command(s) may be inserted into the frame. The other command(s) may be directed to the same or different memory module 806 as the first command. In this manner multiple commands may be initiated within the same clock cycle.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A cascaded interconnect system comprising:
   one or more memory modules;
   a memory controller for generating data frames that include one or more plurality of commands, each data frame comprised of the same number of transfers;
   a memory bus, wherein the memory controller and the memory modules are interconnected by a packetized multi-transfer interface via the memory bus and wherein the frames are transmitted to the memory modules via the memory bus; and
   a command decode matrix specifying command decodes and one or more associated transfers for locating the commands in the data frames.

2. The system of claim 1 wherein the commands are directed to two or more memory modules.

3. The system of claim 1 wherein the commands are directed to the same memory module.

4. The system of claim 1 wherein each frame is transmitted within a single memory clock cycle.

5. The system of claim 1 wherein the memory bus includes a downstream memory bus.

6. The system of claim 1 wherein each frame includes eight transfers, each transfer includes eight command bits and the commands are stored in the command bits in the frame.

7. The system of claim 1 wherein each frame includes one to four memory commands and seventy-two bits of write data.

8. The system of claim 1 wherein one or more of the commands are primary commands.

9. The system of claim 1 wherein one or more of the command are secondary commands.

10. The system of claim 1 wherein the commands are a mix of secondary and primary commands.

11. The system of claim 1 wherein the memory bus includes a plurality of segments and the system further comprises a segment level sparing module to provide segment level sparing for the memory bus upon segment failure.

12. The system of claim 1 wherein the memory device data bus operates at a data rate and the memory bus operates at four times the data rate.

13. The system of claim 1 further comprising a bus level error correcting code fault detection and correction logic block to provide bus level error fault detection and correction.

14. The system of claim 1 wherein the memory module is a buffered memory module.

15. The system of claim 1 wherein at least one of the data frames further includes write data.

16. A method for a memory subsystem command interface, the method comprising:
   receiving data frames including a plurality of commands at a current memory module, wherein the current memory module is included in a cascaded interconnect system that includes a memory controller and one or more memory modules that are interconnected via a memory bus, and each data frame is comprised of the same number of transfers; and
   executing one or more of the commands in response to the one or more commands being directed to the current memory module, the executing including accessing a command decode matrix specify command decodes and one or more associated transfers for locating the commands in the date frame.

17. The method of claim 16 wherein the transfers are received within a single memory clock cycle.

18. The method of claim 16 wherein the plurality of commands includes one command directed to the current memory module and another command directed to another memory module.

19. The method of claim 16 wherein the plurality of commands includes two commands directed to the current memory module.

20. The method of claim 16 wherein each of the data frames includes eight transfers, each transfer includes eight command bits and the commands are stored in the command bits in the frame.

21. The method of claim 16 wherein each of the data frames includes one to four memory commands and seventy-two bits of write data.

22. The method of claim 16 wherein the input signal includes two commands.

23. The method of claim 22 wherein a first command is located in the first seven transfers of the frame and a second command is located in the eighth transfer of the frame or alternatively, the first command is located in the first four transfers of the frame and the second command is located in the last four transfers of the frame.

24. The method of claim 16 wherein at least one of the data frames includes three commands.

25. The method of claim 24 wherein a first command is located in the first four transfers of the frame, a second command is located in the fifth through seventh transfer of the frame and a third command is located in the eight transfer of the frame or alternatively, the first command is located in the first three transfers of the frame, the second command is located in the fourth transfer of the frame and the third command is located in the fifth through eighth transfer of the frame.

26. The method of claim 16 wherein at least one of the data frames includes four commands.

27. The method of claim 26 wherein a first command is located in the first three transfers of the frame, a second command is located in the fourth transfer of the frame, a third command is located in the fifth through seventh transfer of the frame and a fourth command is located in the eight transfer of the frame.

28. The method of claim 26 wherein at least one of the data frames further includes write data.

29. The method of claim 16 further comprising:
   identifying one of the commands as a slow command; and
   monitoring a single bit line in response to the identifying, wherein the executing is performed further in response to the single bit line transitioning from one state to another, thereby eliminating the need for high speed link training and initialization to perform the slow commands.

30. A storage medium encoded with machine readable computer program code for providing a memory subsystem command interface, the storage medium including instructions for causing a computer to implement a method comprising:

receiving data frames a plurality of commands at a current memory module, wherein the current memory module is included in a cascaded interconnect system that includes a memory controller and one or more memory modules that are interconnected via a memory bus, and each data frame is comprised of the same number of transfers; and executing one or more of the commands in response to the one or more commands being directed to the current memory module, the executing including accessing a command decode matrix.

31. The storage medium of claim 30 wherein the transfers are received within a single memory clock cycle.

32. The storage medium of claim 30 wherein the plurality of commands includes one command directed to the current memory module and another command directed to another memory module.

33. The storage medium of claim 30 wherein the plurality of commands includes two commands directed to the current memory module.

34. The storage medium of claim 30 wherein the at least one of the data frames include one to four memory commands and seventy-two bits of write data.

* * * * *